Dec. 28, 1954 N. F. MOODY 2,698,383

ELECTRONIC COUNTER

Filed June 16, 1952 3 Sheets-Sheet 1

Inventor
Norman F. Moody
by Smart & Biggar
Attorneys.

Dec. 28, 1954 N. F. MOODY 2,698,383

ELECTRONIC COUNTER

Filed June 16, 1952 3 Sheets-Sheet 2

Inventor
Norman F. Moody
by Smart & Biggar
Attorneys.

Dec. 28, 1954 N. F. MOODY 2,698,383

ELECTRONIC COUNTER

Filed June 16, 1952 3 Sheets-Sheet 3

Inventor
Norman F. Moody
by- Smart & Biggar
Attorneys.

United States Patent Office
2,698,383
Patented Dec. 28, 1954

2,698,383

ELECTRONIC COUNTER

Norman F. Moody, Ottawa, Ontario, Canada, assignor to National Research Council, Ottawa, Ontario, Canada, a body corporate of Canada Application June 16, 1952, Serial No. 293,788

Claims priority, application Canada April 10, 1952

13 Claims. (Cl. 250—27)

Figure 1:
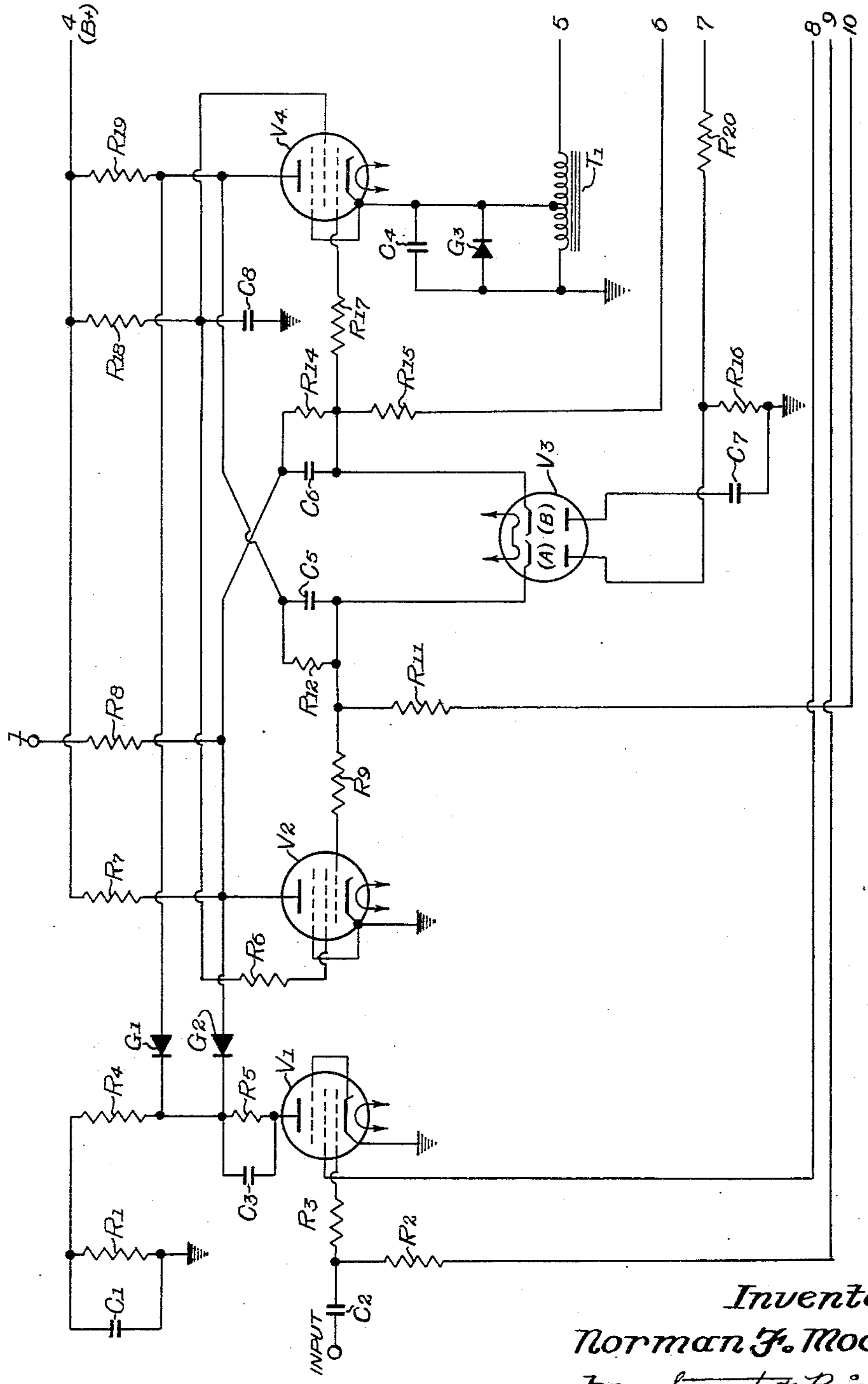

This invention relates to electronic counters of the type suitable for automatic counting of rapidly occurring events such as cosmic rays, radiations from radio-active material, or voltage transients in an electric circuit.

A commonly used electronic counter circuit is a series chain of binary switching circuits. Each binary switching circuit, sometimes called a multivibrator circuit or a flip-flop circuit, comprises a pair of triode or pentode tubes having the anode of each tube interconnected to the grid of the opposite tube and arranged in such a way that conduction through one tube will stop conduction in the other tube. The anode potential of each tube changes from a low value during the period of conduction to a high value during the period of non-conduction the circuit being so arranged that an input pulse applied to the interconnections in parallel causes the state of conduction of each tube of the pair to be reversed. That is, if the first tube is conducting and the second tube cut-off, an input pulse will cause the first tube to cut-off and the second tube to become conductive. The rise and fall in anode potential, form the edges of a square wave voltage pulse and, if only the square wave voltage pulses produced by one of the tubes of the binary pair are applied to the input of the second binary switching circuit, the result is a single input pulse to the second circuit for every two input pulses to the first binary switching circuit.

There exists a great need for electronic counters which will count very quickly. In order to accomplish fast counting, it is necessary to design input circuits which will operate to give fast triggering operation of the binary pairs. It is proposed in the present invention to employ a trigger tube coupled as an amplifier to the input of each binary pair. It will be understood that the pulses which are fed to the input to the trigger tube must be of such a nature as to cooperate with the trigger tube to provide the fast triggering action which is necessary for fast recording of pulses by a binary pair. An electronic counter of the type hereinabove described usually has its input connected to a Geiger-Müller counter. A Geiger-Müller counter will generate pulses which, when amplified by a trigger tube, quickly trigger the first binary pair. These conditions must be duplicated between the output of the first pair and the input to the second pair. Again, a trigger tube may be connected as an amplifier to the input of the second pair; but the output of the first pair, which is fed to the trigger tube, must be of such a nature as to result in the proper triggering action by the trigger tube. In prior electronic counters employing binary pairs in cascade, the output of the first pair has usually been taken from the plate circuit of one of the binary tubes. The charge of current in this plate circuit is relatively small, whereas a relatively large, steep-fronted current is required by the trigger tube of the second stage. Thus, interpair coupling in prior electronic counters has not given the conditions necessary for high speed recording of pulses. In order to achieve this high speed recording of pulses, it is necessary to give special consideration to the design of the output circuit of each binary pair in accordance with the requirements of the apparatus with which it is to be coupled. Thus, in interpair coupling where high speed is desired, the output of the first binary pair must provide a large, steep-fronted surge current to ensure reliable triggering of the second binary pair.

The problem, therefore, is to design an output circuit for a binary pair which will generate a high speed, heavy surge current. Further, this current must be generated without undue disturbance of the operation of that binary pair. As noted above the conditions existing in the plate circuit are not suitable for this purpose. The same may be said for the screen grid circuit if such is provided. However, in the electronic counter of the present invention, the entire space current of each binary tube appears at the cathode and this current is greatest at the instant of conduction due to the occurrence of grid current. It is the principal object of the present invention to utilize this cathode circuit current through the use of a transformer in conjunction with a rectifier and a capacitor. The capacitor which is of a low value is connected across the primary of the transformer and provides some measure of integration so that the speed of the increase of cathode current is not unduly damped by the added cathode impedance. The transformer is preferably of the auto-transformer type, and the rectifier associated therewith functions to offset the tendency of the primary top of the auto-transformer to shoot negative when the current is turned off in that tube.

The electronic counter of the present invention includes other circuit arrangements which contribute toward high speed counting. If the events to be counted occur at a rate which is faster than the rate at which the first binary pair can pass through a half-cycle of operation then the circuit will not record some of the rapidly occurring events. It will be understood that a full cycle of operation is accomplished when each tube of a binary pair has passed through the stages of conduction and non-conduction. Only a minor part of the time required for a binary pair to pass through a half-cycle of operation is taken up by the passage of the effect of the input pulse through the circuit. A major portion of the time required for a half-cycle of operation is taken up by the time required for the circuit to "recover" itself so that it is then able to receive a second pulse. It is a supplementary object of the present invention to provide circuit arrangements whereby this "recovery time" is reduced.

One of the conditions which causes the electronic counter to have a high recovery time in comparison with the time represented by the input pulse width is the occurrence of relatively large anode voltage swings. Unnecessary time is required if the anode voltage swings outside of the useful anode voltage range. Time is expanded not only in swinging away from the useful range but also in returning to the useful range. Therefore, if the anode voltage swings could be limited to the useful range, a shorter recovery time would result. The binary pair could thereby pass through a half-cycle of operation in less time and be capable of recording some of those rapidly occurring events that previously went unrecorded.

In the apparatus of the present invention, I have provided means whereby the anode voltage swings are limited to their useful range. This means consists of rectifiers connected in the inputs of the binary switching circuits in such a way that the rectifier means begins to conduct when the anode voltage tends to swing above the useful range.

Another of the conditions which contributes to a high recovery time for an electronic counter is the occurrence of large grid voltage swings. As in the case of the anode voltage swings, if the grid voltage is limited to the useful range and the time expended in swinging away from and returning to the useful range is substantially eliminated, the recovery time is reduced. To keep the grid voltage from swinging too far negative, I provide further rectifier means connected in such a way to a negative source of voltage that any tendency of the grid voltage to swing negatively to a value above that of the source of voltage results in the rectifier conducting. It will be understood that any tendency for the grid voltage to swing too far positively would be prevented by the occurrence of grid current.

Figure 1B:
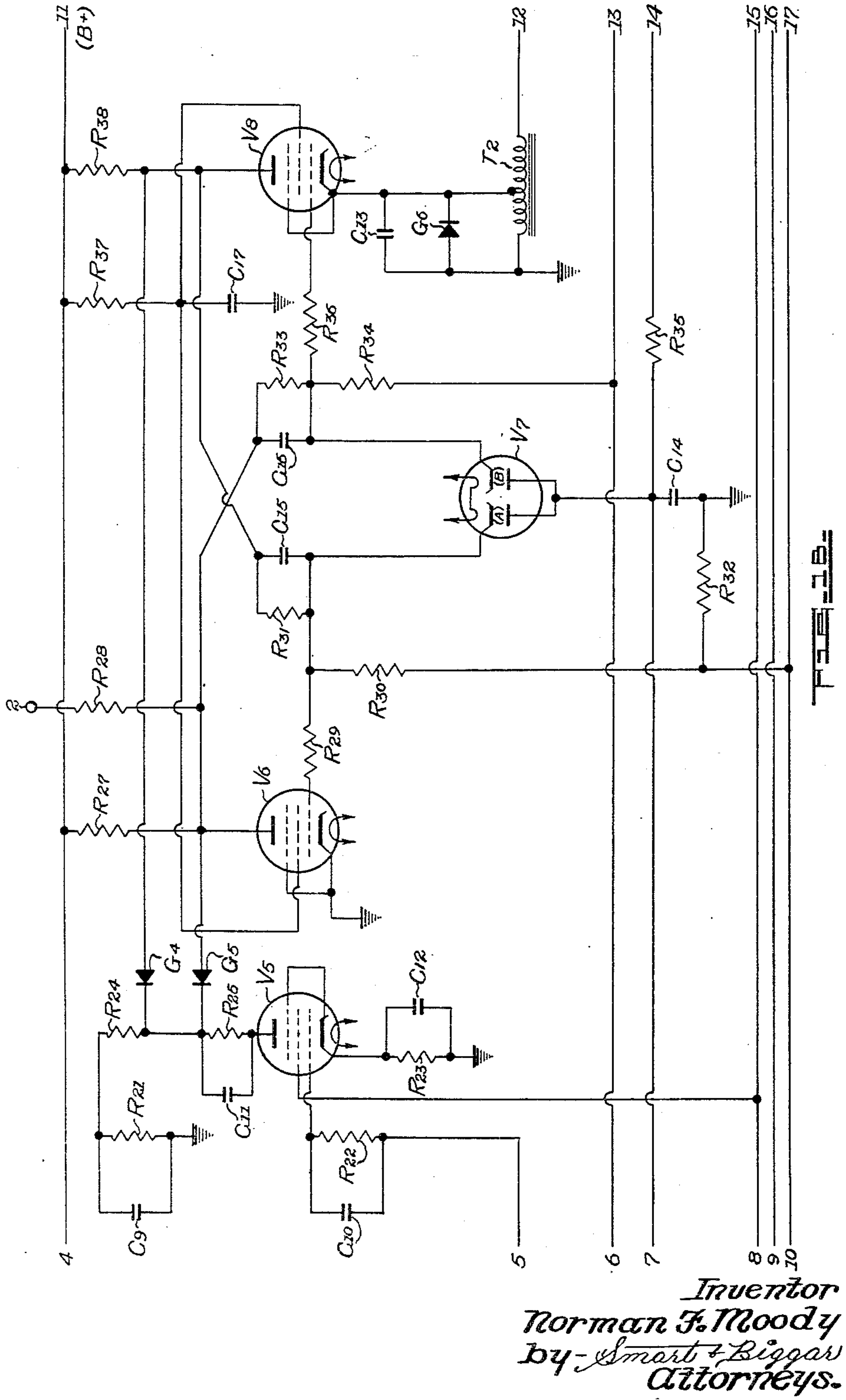
Figure 3:
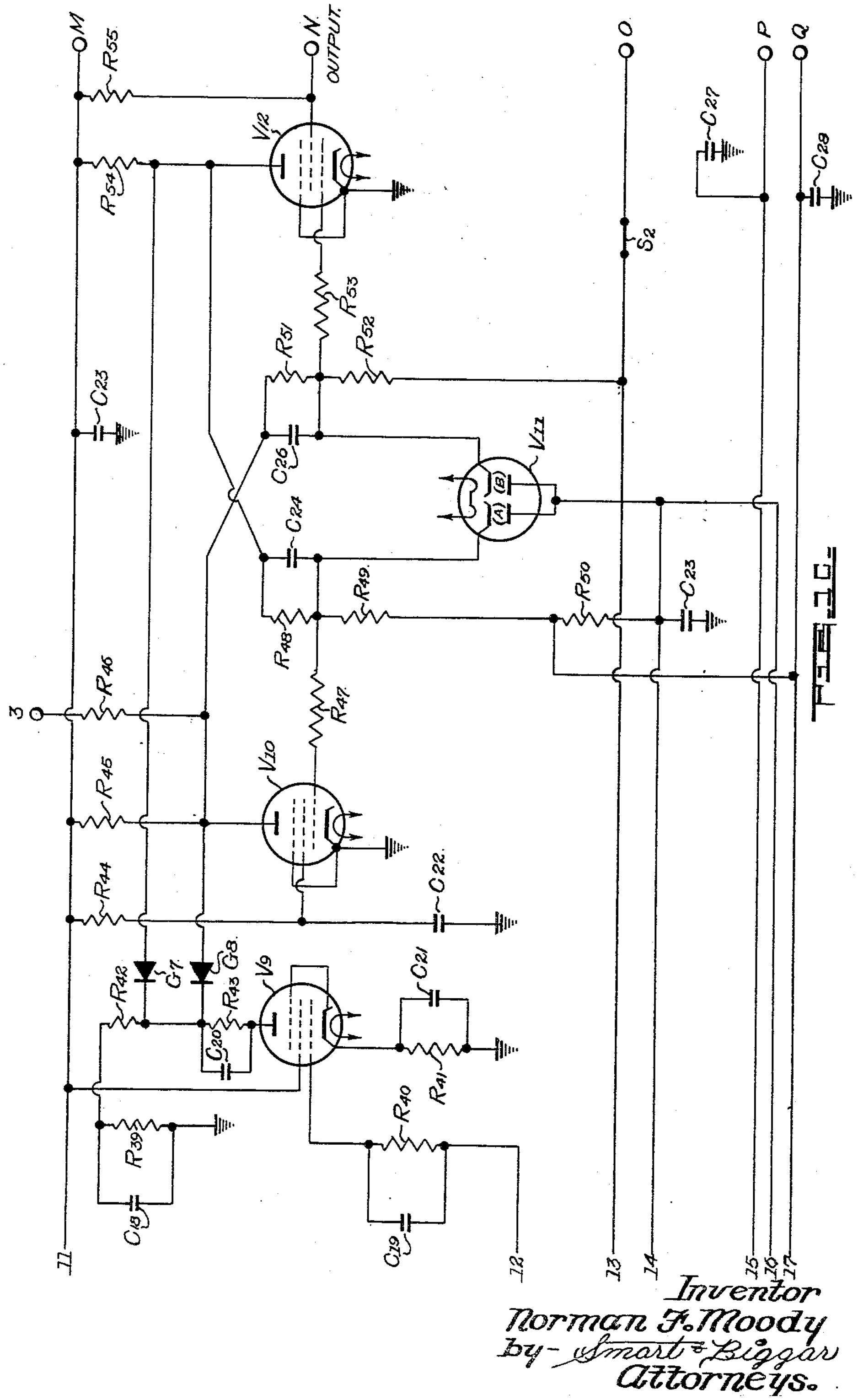

The invention will be further described by reference to the attached drawings which illustrate a particular embodiment thereof, and in which Figure 1*a* shows the first stage of a three stage electronic counter according to the invention, Figure 1*b* shows the second stage thereof, and Figure 1*c* shows the third stage thereof.

It will be understood that terminals having the same reference character designation in two figures indicate connection therebetween.

The switching circuits of Figures 1*a*, 1*b* and 1*c* are similar in operation but differ in certain of the circuit parameters. The following general discusstion will therefore be more particularly concerned with the first switching circuit of the series chain. V2 and V4 represent the tubes which go to make up the first binary pair. The anode of V2 is connected to the grid of V4 through RC network C6, R14 and R17, whereas the anode of V4 is connected to the grid of V2 through RC network C5, R12 and R9.

Pulses which it is desired to count are applied to the binary switching pair V2 and V4 through a trigger tube V1 and rectifying means G1 and G2 which are preferably of the germanium crystal type. The buffer tube V1 has applied to its control grid the pulses to be counted and is capable of supplying the binary pair with the heavy surge current required for fast operation. Thus V1 acts to trigger the binary pair into operation. The rectifiers G1 and G2 serve to limit the anode voltage excursion of tubes V2 and V4 so that during the operation of the binary pair the anode voltage rise is substantially reduced. Thus by virtue of the limitation of the anode voltage excursions of the tubes V2 and V4, the binary pair is able to "recover" more quickly and is thereby capable of recording pulses which occur at a faster rate.

The double diode V3 has the function of limiting the negative control grid excursions of V2 and V4 so that (as in the case of limiting the anode voltage excursions) the circuit is able to "recover" more quickly than if the grid excursions were not so limited. The limitation is accomplished by maintaining the anodes of the double diode at the maximum negative voltage at which the grids of V2 and V4 are to operate. If the grid of either tube tends to rise negatively above this voltage than the diode conducts and the grid voltage is held to the desired value.

Any tendency toward substantial positive grid excursion of V2 and V4 would be prevented by the occurrence of grid current in V2 or V4.

The coupling from the first stage of the electronic counter to the second stage includes a transformer T1 in the cathode circuit of V4. The use of such a transformer T1, so disposed enables the large current changes in the cathode circuit of V4 to be available for tripping the next stage of the counter.

When the second pulse arrives at the input of V1, the effect is to turn on the current in V4 very rapidly so that a high rate of change of current occurs in the primary of T1. The effect of the condenser C4 is to by-pass the primary of T1, so that the impedance represented by the introduction of transformer T1 does not appreciably damp the cathode current pulse. In order for C4 to operate in the above manner it must have a small capacitance.

The circuit shown in Figure 1*a* and its operation will now be described in more detail.

An input pulse is applied to the grid of V1 and causes V1 to supply a heavy surge current to its output thereby causing a fast trigger action of the binary pair V2, V4. The effect of the trigger action is increased by the condenser C3 connected across the plate resistor R5 by offsetting the potentiometer action of R4 and R5. The anode potential of V1 (which is also the voltage appearing at the anodes of V2 and V4) is substantially defined by the resistor-rectifier network R1, R4, G2, R14 and R7 when V2 is cut-off and V4 conducting, and by R1, R4, G1, R12 and R19 when the steady-state conditions of V2 and V4 are reversed. It is noted that R17 and R9 are small in comparison with the other resistors in the network and R17 and R9 can thereby be neglected as far as effecting the anode potential of V1, V2 or V4.

When the first positive pulse arrives at the grid of V1 it turns on the current in V1 generating a sharp negative going pulse in the anode of V1 which is transferred via G2, C6, R14 and R17 to the grid of V4. This causes the grid of V4 to go negative thus cutting-off V4, giving a resultant reduction in the plate current of V4 which thereby causes the anode voltage of V4 to rise. The anode voltage rise of V4 is transferred via C5, R12 and R9 to the grid of V2 which then proceeds to go more positive, unclamp from diode V3(*a*) and turn on current of V2. The anode of V2 thereby goes negative which effect is transferred to the grid of V4 via C6, R14 and R17. This cumulative action, during which the binary pair V2, V4 has undergone a complete half-cycle of operation, takes place very rapidly so that little time elapses before the circuit is in a condition to receive a second pulse. Thus the anode of V2 is now "bottomed" and V4 is cut-off. "Bottoming" is the process of defining the potential at the plate of a pentode by operating below the base of the Ep/Ip characteristic. A tube is said to have "bottomed" when further positive increase in grid current results in no further increase in plate current.

Each binary pair is arranged to give a balanced drain on the B+ supply. In Figure 1*a*, for example, tubes V2 and V4 have a common screen grid supply from the B+ source through resistor R18. Also, the rise and fall in anode voltage of V2 and V4 alternate from one tube to the other so that again the drain on the B+ supply is balanced. Resistors R6 (in the screen grid circuit) and R8 (in the anode circuit) are provided as monitoring points. R8 may also serve as a series resistor when a neon indicator is provided. Such neon indicators may be connected to the terminals 1 (Figure 1*a*), 2 (Figure 1*b*) and 3 (Figure 1*c*).

A second input pulse at the grid of V1 again produces a negative pulse in the anode thereof which is transferred via G1 to the grid of V2 and reverses the process performed as a result of the first input pulse. Thus when a train of input pulses are fed to V1, V2 conducts the receipt of each odd numbered pulse whereas V4 conducts on the even pulses and by applying the output of only one of the tubes of the pair (in this case V4) to the input of the second binary switching circuit only every second pulse is recorded. The output pulse of the first switching circuit is generated in the cathode circuit of V4. Initially, V4 is conducting and V2 is cut-off. This condition is given to the circuit by operation of the reset switch S2 (Figure 1*c*). Although S2 is shown as a manual switch, it will be understood that automatic means may be employed. The opening of S2 momentarily interrupts the bias supply for V4 (also V8 and V12) so that the grid goes slightly positive allowing V4 to conduct and placing the binary pair in the proper condition for recording pulses applied to the grid of V1. A similar action takes place in the second and third binary switching circuits. When V4 is put in a conductive condition its cathode is slightly positive until the first triggering pulse cuts-off the tube. The tendency caused thereby for the cathode to shoot negative is prevented by the rectifier G3, so that only a small negative pulse appears at the output of T1. The second triggering pulse causes V4 to conduct with a resultant sudden positive voltage rise in the cathode circuit of V4. This voltage aided by the action of condenser C4 appears in the primary of auto-transformer T1 whereby it is passed to the input of the second binary switching circuit (shown in Figure 1*b*). Thus since the effect of the first binary switching circuit is only felt by the second binary switching circuit during the conduction periods of V4, the second binary switching circuit will only receive one input pulse for every two input pulses applied to V1.

The combined effect of condenser C4 and transformer T1, and the use of the cathode current provide trigger tube V5 (Figure 1*b*) with a heavy current surge which has a high rate of change at the instant that V4 begins to conduct. Thus, the trigger tube V5 receives the kind of pulse which is necessary for it to trigger the second binary pair V6, V8. The second (Figure 1*b*) and third (Figure 1*c*) binary switching circuits operate in a manner similar to the first binary switching circuit so that the overall result is to provide a single output pulse for every eight input pulses.

The double diode V3 functions in the grid circuits of V2 and V4 in much the same way as the rectifiers G1 and G2 function in the plate circuits thereof. That is, when the grids of V2 or V4 tend to exceed the value of the voltage to which the anodes of V3 are connected, the diode V3 will conduct and thereby prevent the grids of V2 or V4 from appreciably exceeding the value of the anode voltage of V3.

It is noted that the output of the third binary switching circuit (Figure 1*c*) is taken from the screen grid of V12 whereas the outputs of the first and second switching circuits (Figures 1*a* and 1*c*) are taken from the cathode circuits thereof. It will be understood, however, that the output may be taken from the cathode of V12 as in the case of V4 and V8, or may be taken from the plate circuit of V12 through a blocking condenser. The choice of output circuit for V12 will depend on the requirements of the input of the particular apparatus to which the electronic counter is to be connected. The following information is given for the purpose of showing the differences in certain of the circuit parameters in the three stages of the electronic counter and also to show a complete working example.

*Resistors*

| | | | |
|---|---|---|---|
| R1 | 15 K. | R30 | 250 K. |
| R2 | 4.7 K. | R31 | 100 K. |
| R3 | 1 K. | R32 | 2.5 K. |
| R4 | 1 K. | R33 | 100 K. |
| R5 | 1 K. | R34 | 250 K. |
| R6 | 1 K. | R35 | 2 K. |
| R7 | 22 K. | R36 | 1 K. |
| R8 | 1 meg. | R37 | 27 K. |
| R9 | 330 ohms. | R38 | 33 K. |
| R11 | 250 K. | R39 | 47 K. |
| R12 | 100 K. | R40 | 4.7 K. |
| R14 | 100 K. | R41 | 5.6 K. |
| R15 | 250 K. | R42 | 1.5 K. |
| R16 | 3.3 K. | R43 | 1.5 K. |
| R17 | 330 ohms. | R44 | 12 K. |
| R18 | 15 K. | R45 | 33 K. |
| R19 | 22 K. | R46 | 1 meg. |
| R20 | 1.5 K. | R47 | 1 K. |
| R21 | 47 K. | R48 | 100 K. |
| R22 | 2.2 K. | R49 | 250 K. |
| R23 | 5.6 K. | R50 | 120 K. |
| R24 | 1.5 K. | R51 | 100 K. |
| R25 | 1.5 K. | R52 | 250 K. |
| R26 | 1 K. | R53 | 1 K. |
| R27 | 33 K. | R54 | 33 K. |
| R28 | 1 meg. | R55 | 12 K. |
| R29 | 1 K. | R56 | 470 K. |

*Condensers*

| | | | |
|---|---|---|---|
| C1 | 0.1 mfd. | C15 | 20 mmfds. |
| C2 | 0.01 mfd. | C16 | 20 mmfds. |
| C3 | 100 mmfds. | C17 | 0.01 mfd. |
| C4 | 40 mmfds. | C18 | 0.1 mfd. |
| C5 | 20 mmfds. | C19 | 10 mmfds. |
| C6 | 20 mmfds. | C20 | 100 mmfds. |
| C7 | 0.1 mfd. | C21 | 0.1 mfd. |
| C8 | 0.01 mfds. | C22 | 100 mmfds. |
| C9 | 0.1 mfds. | C23 | 0.1 mfd. |
| C10 | 10 mmfds. | C24 | 20 mmfds. |
| C11 | 100 mmfds. | C25 | 0.1 mfd. |
| C12 | 0.1 mfd. | C26 | 20 mmfds. |
| C13 | 100 mmfds. | C27 | 0.001 mfd. |
| C14 | 0.1 mfd. | C28 | 0.001 mfd. |

*Germanium crystals*

G1 to G8—1N63

*Tubes*

V3, V7, V11—6A15
*V1, V5, V6, V8, V9—6AK5
*V2, V4, V10, V12—6AU6

* The first and third binary pairs use tubes of heavier dissipation than the second pair—the first to achieve speed, and the third to supply adequate drive to subsequent apparatus for which the electronic counter may be adapted to be connected.

*Terminal voltages*

M—the anode voltage supply for all pentode tubes and the screen grid supply for tubes V2, V4, V6, V8, V9, V10 and V12 (plus 150 volts).
N—output from third binary switching circuit (plus 75 volts).
O—the bias voltage supply for tubes V4, V8 and V12 (minus 100 volts).
P—the screen grid voltage supply for tubes V1 and V5 (plus 150 v.).
Q—the bias voltage supply for tubes V2, V6 and V10.

*Typical tube voltage*

Typical voltages appearing at the terminals of the tubes of the first binary pair when it is in a condition to receive an initial pulse, i. e. after S2 has been operated.

| | Control Grid | Screen Grid | Plate | Cathode |
|---|---|---|---|---|
| V1 | −8 v | +150 v | 55 v | 0. |
| V2 | −4.5 v | +80 v | 55 v | 0. |
| V3 {A | | | −4.5 v | 55 v. |
| V3 {B | | | −4.5 v | −4.5 v. |
| V4 | slightly positive | +80 v | + 8 v | slightly positive. |

The function of rectifiers G1 and G2 will now be described by reference to the typical tube voltages listed above. The anodes of V2 and V4, when cut-off, tend to rise to the value of the anode voltage supply, in this case +150 v. The cathode side of the rectifiers G1 and G2 are maintained at +55 v. since they are connected to the anode of V1. Any tendency of the anodes of G1 and G2 to rise above the value of 55 v. will cause the rectifiers to conduct, thereby maintaining an upper limit on the anodes of G1 and G2 only slightly above 55 v. The maximum voltage appearing at the anode of each tube of the binary pair will occur when that tube is cut-off. This voltage is determined by the current drawn through the resistor R7, in the case of V2, and R19, in the case of V4. Supposing the circuit is in a condition such that V2 is cut-off, the current drawn through R7 will be equal to the B+ voltage (terminal M in Figure 1*c*) divided by the resistances effecting such current:

∴the current through $$R7 = \frac{150}{R7 + \frac{(R1+R4)R14}{R1+R4+R14}}$$

$$\cong 4.2 \text{ ma.}$$

It is noted that some of the resistances have been neglected (such as R17 and the value of G2) since they are small in comparison with the rest of the resistances. Thus the voltage at the anode of $$V2 \text{ (at cut-off)} = 150 - R7(4.2) = 58 \text{ v.}$$

The inclusion of G2 (and G1) assures a maximum voltage of approximately 58 volts at the anode of V2 (and V4).

If, for example, V4 is conducting and V2 cut-off, the anode of V2 will tend to rise to the value of 150 v. Any substantial rise of the anode of V2 above 55 v. will allow G2 to conduct causing current to be drawn through R7 to reduce the anode voltage of V2 to a value of approximately 55 volts.

The inclusion of rectifiers G1 and G2 in the circuit reduces the recovery time of the binary pair by eliminating the time formerly expended by the anode voltage swings of V2 and V4 in going from +55 volts to a value approaching 150 v. and in returning to 55 volts therefrom.

Similarly the inclusion of double diode V3 in the circuit ensures that the grid of V2 or V4 will not appreciably swing negatively above the value of minus 4.5 volts which is the magnitude of the anode voltage given, as an example, hereinabove under the heading Typical tube voltages.

In summary, it is noted that the factors which in the electronic counter shown in the attached figures contribute to a faster counting rate are:

(*a*) The use of a special output circuit for at least the first binary pair, (*b*) The use of rectifier means to limit the anode voltage swings of the binary tubes, and (*c*) The use of rectifier means to limit the grid voltage swings of the binary tubes.

What I claim as my invention is:

1. A binary switching circuit comprising two electronic vacuum tubes each having at least an anode, a grid and a cathode, the anode of each tube being connected to the grid of the other tube, the output circuit of said binary switching circuit being taken from the cathode of one of said tubes, said output circuit comprising a transformer having a primary winding and a secondary winding, and a rectifier connected across the primary of said transformer so as to conduct current in a direction away from said cathode of said one of said tubes.

2. A binary switching circuit comprising two electronic vacuum tubes each having at least an anode, a grid and a cathode, the anode of each tube being connected to the grid circuit of the other tube, a third tube having at least an anode, a grid and a cathode, the grid of said third tube being connected to the input of said switching circuit, the anode of said third tube being connected to each one of the anode circuits of said two tubes, the output circuit of said binary switching circuit being taken from the cathode of one of said two tubes, said output circuit comprising a transformer having a primary winding and a secondary winding, and a rectifier connected across the primary of said transformer so as to conduct current in a direction away from said cathode of said one of said two tubes.

3. A binary switching circuit comprising two electronic vacuum tubes each having at least an anode, a grid and a cathode, the anode of each tube being connected to the grid of the other tube, rectifier means connected between the input to said binary switching circuit and the anode circuits of said two tubes so as to conduct current from said anode circuits towards said input whereby the upper limit of the anode voltage of said two tubes is set, the output circuit of said binary switching circuit being taken from the cathode of one of said tubes, said output circuit comprising a transformer having a primary winding and a secondary winding, and a rectifier connected across the primary of said transformer so as to conduct current in a direction away from said cathode of said one of said tubes.

4. A binary switching circuit comprising two electronic vacuum tubes each having at least an anode, a grid and a cathode, the anode of each tube being connected to the grid of the other tube, the output circuit of said binary switching circuit being taken from the cathode of one of said tubes, said output circuit comprising a transformer having a primary winding and a secondary winding, and a capacitor connected across said primary winding.

5. A binary switching circuit as claimed in claim 4, wherein said transformer is of the auto-transformer type.

6. A binary switching circuit as claimed in claim 4, wherein a rectifier is connected across the primary of said transformer so as to conduct current in a direction away from said cathode of said one of said tubes.

7. A binary switching circuit as claimed in claim 4, wherein rectifier means is connected between a source of predetermined voltage and the grid circuits of said two tubes so as to conduct current when said grid circuits tend to negatively exceed the value of said predetermined voltage.

8. A binary switching circuit as claimed in claim 4, wherein rectifier means is connected between a source of voltage having a predetermined negative value and the grid circuits of said two tubes so as to conduct current when said grid circuits tend to negatively exceed said predetermined value whereby the negative upper limit of the grid voltage is set.

9. A binary switching circuit comprising two electronic vacuum tubes each having at least an anode, a grid and a cathode, the anode of each tube being connected to the grid circuit of the other tube, a third tube having at least an anode, a grid and a cathode, the grid of said third tube being connected to the input of said switching circuit, the anode of said third tube being connected to each one of the anode circuits of said two tubes, the output circuit of said binary switching circuit being taken from the cathode of one of said two tubes, said output circuit comprising a transformer having a primary winding and a secondary winding, and a capacitor connected across said primary winding.

10. A binary switching circuit as claimed in claim 9, wherein said transformer is of the auto-transformer type.

11. A binary switching circuit as claimed in claim 9, wherein a rectifier is connected across the primary of said transformer so as to conduct current in a direction away from said cathode of said one of said two tubes.

12. A binary switching circuit as claimed in claim 9, wherein rectifier means is connected between a source of predetermined voltage and the grid circuits of said two tubes so as to conduct current when said grid circuits tend to negatively exceed the value of said predetermined voltage.

13. A binary switching circuit as claimed in claim 9, wherein rectifier means is connected between a source of voltage having a predetermined negative value and the grid circuits of said two tubes so as to conduct current when said grid circuits tend to negatively exceed said predetermined value whereby the negative upper limit of the grid voltage is set.

References Cited in the file of this patent

UNITED STATES PATENTS

| Number | Name | Date |
|---|---|---|
| 2,416,188 | McClellan | Feb. 18, 1947 |
| 2,465,249 | McClellan | Mar. 22, 1949 |

OTHER REFERENCES

"A Digital Electronic Correlator" by Singleton, page 1426, Fig. 11 and description of; Proc. of the IRE for December 1950.

Radiation Lab. Series, vol. 19, April 8, 1949, pages 605–608 and Figs. 17.3–17.4, Sec. 17.3.